US010155699B2

(12) United States Patent
Sim et al.

(10) Patent No.: US 10,155,699 B2
(45) Date of Patent: Dec. 18, 2018

(54) APPARATUS AND SYSTEM FOR TREATING ORGANIC MASS

(71) Applicant: Biomax Holdings Pte Ltd, Singapore (SG)

(72) Inventors: Eng Tong Sim, Singapore (SG); Siok Lui Chua, Singapore (SG); Chum Mok Puah, Singapore (SG)

(73) Assignee: Biomax Holdings Pte Ltd, Singapore (SG)

( * ) Notice: Subject to any disclaimer, the term of this patent is extended or adjusted under 35 U.S.C. 154(b) by 648 days.

(21) Appl. No.: 14/358,466

(22) PCT Filed: Dec. 10, 2013

(86) PCT No.: PCT/SG2013/000524
§ 371 (c)(1),
(2) Date: May 15, 2014

(87) PCT Pub. No.: WO2014/092648
PCT Pub. Date: Jun. 19, 2014

(65) Prior Publication Data
US 2016/0347676 A1    Dec. 1, 2016

(30) Foreign Application Priority Data

Dec. 14, 2012   (GB) .................................. 1222641.1

(51) Int. Cl.
*C12M 1/00*     (2006.01)
*C12M 3/00*     (2006.01)
(Continued)

(52) U.S. Cl.
CPC ............ *C05F 17/0258* (2013.01); *B01F 3/06* (2013.01); *B01F 7/001* (2013.01); *B01F 7/0025* (2013.01);
(Continued)

(58) Field of Classification Search
CPC ......... B01F 7/04; B01F 7/0025; C12M 27/08; C12M 27/06; C12M 27/00; C12M 21/04
See application file for complete search history.

(56) References Cited

U.S. PATENT DOCUMENTS 4,483,625 A * 11/1984 Fisher ..................... B01F 7/022
                                                        366/196
4,909,634 A     3/1990 Suzuki et al.
(Continued)

FOREIGN PATENT DOCUMENTS

CN            1953826 A      4/2007
CN          201776104 U      3/2011
(Continued)

OTHER PUBLICATIONS

International Preliminary Report on Patentability for International Application No. PCT/SG2013/000524, Report Issued Oct. 3, 2014, dated Oct. 3, 2014, 14 Pgs.
(Continued)

*Primary Examiner* — Nathan A Bowers
(74) *Attorney, Agent, or Firm* — KPPB LLP

(57) ABSTRACT

An apparatus for treating organic mass. The apparatus comprises a treatment chamber and agitation means provided in the chamber to agitate the organic mass. The agitation means comprises a rotatable shaft extending through the chamber, a plurality of agitator arms extending from the shaft, and a paddle connected to each agitator arm. The paddle is arranged to make a first angle with respect to the longitudinal axis of the agitator arm and a second angle with respect to the longitudinal axis of the shaft. There is also provided a system for recycling ammonia generated from the treated organic mass by the apparatus.

23 Claims, 10 Drawing Sheets

(51) Int. Cl.
| | |
|---|---|
| C05F 17/02 | (2006.01) |
| B01F 7/04 | (2006.01) |
| B01F 7/00 | (2006.01) |
| C05F 17/00 | (2006.01) |
| B01F 3/06 | (2006.01) |
| B01F 15/00 | (2006.01) |
| C05B 17/00 | (2006.01) |

(52) U.S. Cl.
CPC ...... B01F 7/00133 (2013.01); B01F 7/00158 (2013.01); B01F 7/00291 (2013.01); B01F 7/00633 (2013.01); B01F 7/04 (2013.01); B01F 15/00331 (2013.01); B01F 15/00396 (2013.01); C05B 17/00 (2013.01); C05F 17/0036 (2013.01); C05F 17/0045 (2013.01); C05F 17/02 (2013.01); C05F 17/027 (2013.01); C05F 17/0264 (2013.01); C05F 17/0276 (2013.01); B01F 2003/063 (2013.01); B01F 2215/0054 (2013.01); Y02P 20/145 (2015.11); Y02W 10/37 (2015.05); Y02W 30/43 (2015.05)

(56) References Cited

U.S. PATENT DOCUMENTS

| | | | | |
|---|---|---|---|---|
| 5,427,947 | A * | 6/1995 | Dalos | B01F 5/0611 366/220 |
| 5,587,320 | A * | 12/1996 | Shindo | A61L 9/16 435/290.1 |
| 5,981,269 | A * | 11/1999 | Park | C05F 17/0018 366/325.1 |
| 6,139,793 | A | 10/2000 | Vanderwal | |
| 6,524,848 | B2 | 2/2003 | Mcnelly et al. | |
| 7,507,577 | B2 * | 3/2009 | Tung | A47K 11/02 4/319 |
| 7,816,127 | B2 | 10/2010 | Nomura | |
| 8,894,272 | B2 * | 11/2014 | Kato | B01F 3/18 366/155.1 |
| 2003/0153071 | A1 * | 8/2003 | Sattler | C05F 17/0217 435/289.1 |
| 2010/0034050 | A1 * | 2/2010 | Erb | B01F 3/04248 366/342 |
| 2012/0252107 | A1 | 10/2012 | Self | |

FOREIGN PATENT DOCUMENTS

| | | |
|---|---|---|
| DE | 29906703 U1 | 9/1999 |
| DE | 102004014163 A1 | 12/2004 |
| EP | 1754553 A1 | 2/2007 |
| EP | 2347834 A2 | 7/2011 |
| FR | 2360 E | 3/1904 |
| GB | 1237630 A | 6/1971 |
| JP | H04130078 A | 5/1992 |
| JP | H091112 A | 1/1997 |
| JP | 2002331275 A | 11/2002 |
| JP | 2004130181 A | 4/2004 |
| WO | 2011119112 A1 | 9/2011 |

OTHER PUBLICATIONS

International Search Report and Written Opinion for International Application No. PCT/SG2013/000524, International Filing Date Dec. 10, 2013, Search Completed Apr. 2, 2014, dated Feb. 18, 2014, 12 pgs.
Supplementary European Search Report for European Application No. 13863573, Search dated Nov. 14, 2016, 2 Pgs.
Chinese Search Report for Application No. 201380003906.2, Filing Date Dec. 10, 2013, dated Nov. 23, 2015, 5 Pgs.
Great Britain Search Report for Application No. GB1222641.1, Filing Date Dec. 14, 2012, Date of Search Apr. 25, 2013, dated Apr. 26, 2013, 2 Pgs.
Xu et al., "Solid Waste Pollution Control Principles and Resourcialization Technology", Metallurgical Industry Press, Jan. 31, 2007, 187-189 Pgs.

* cited by examiner

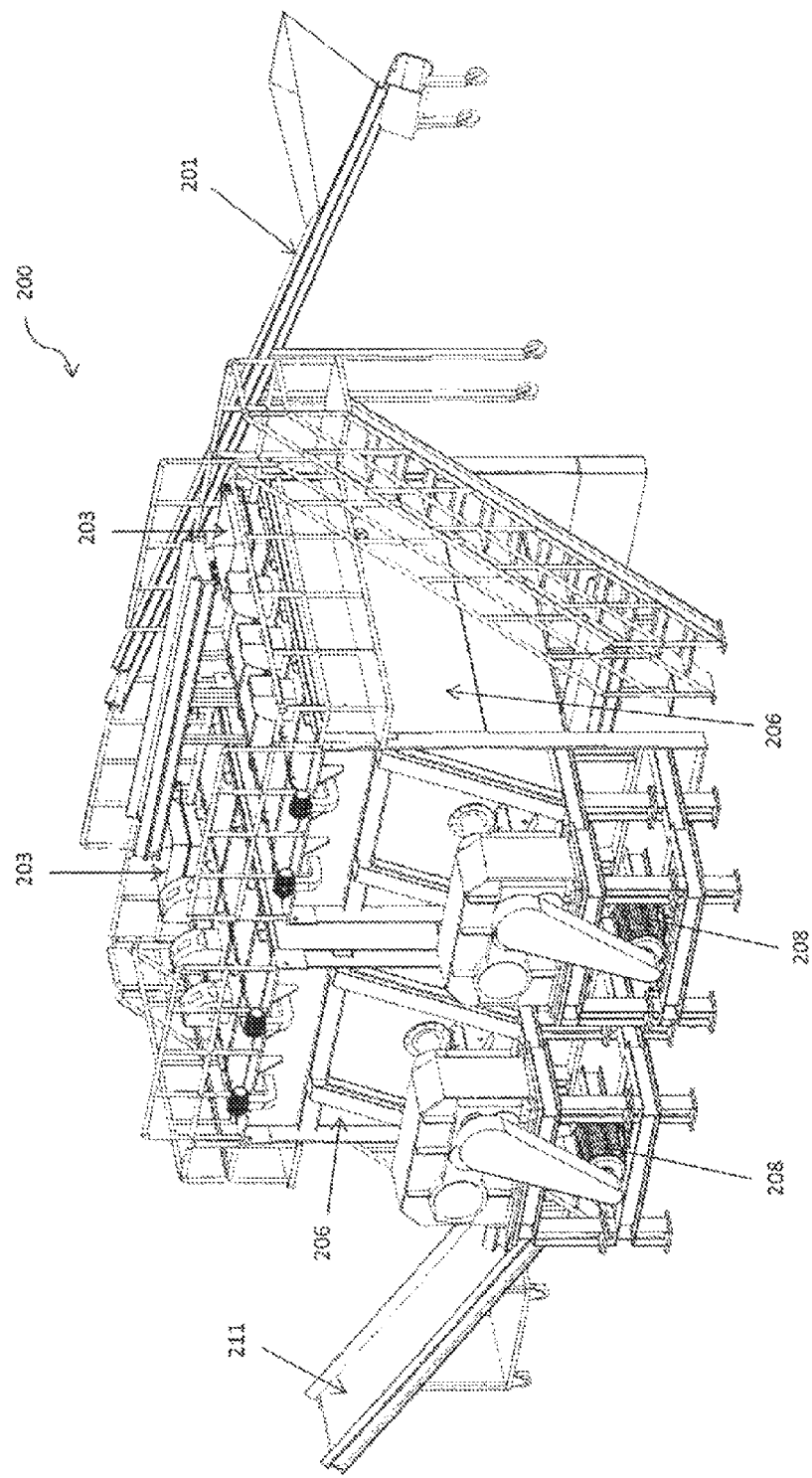

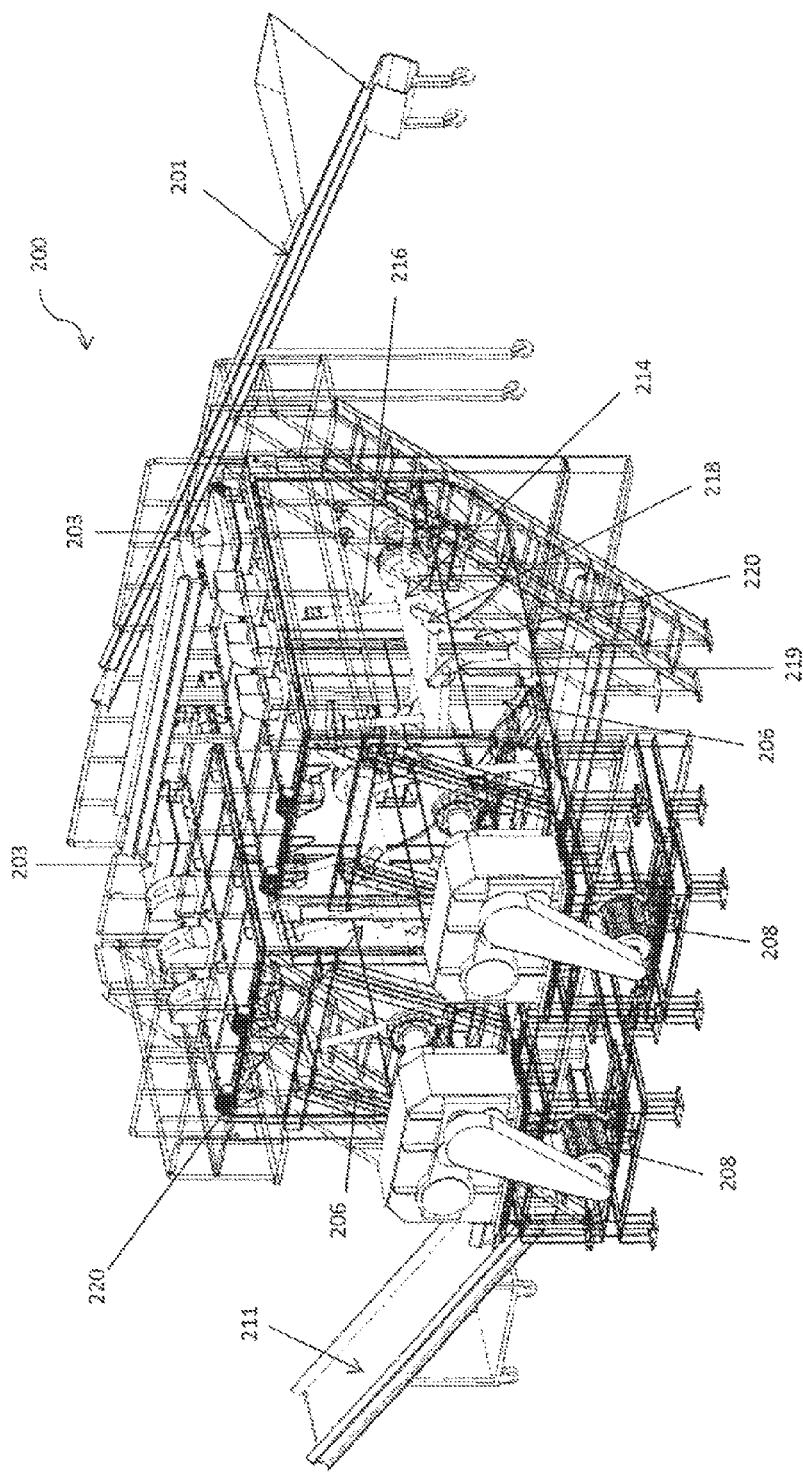

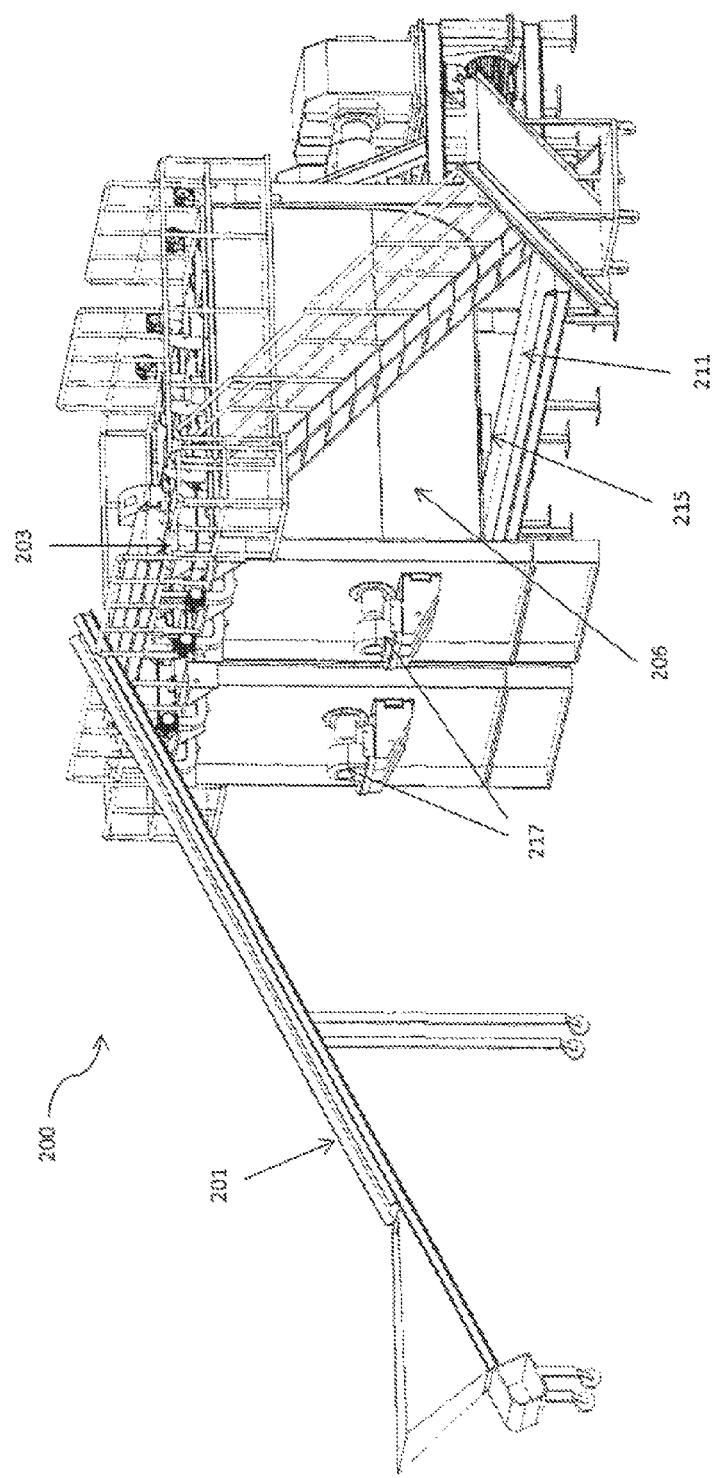

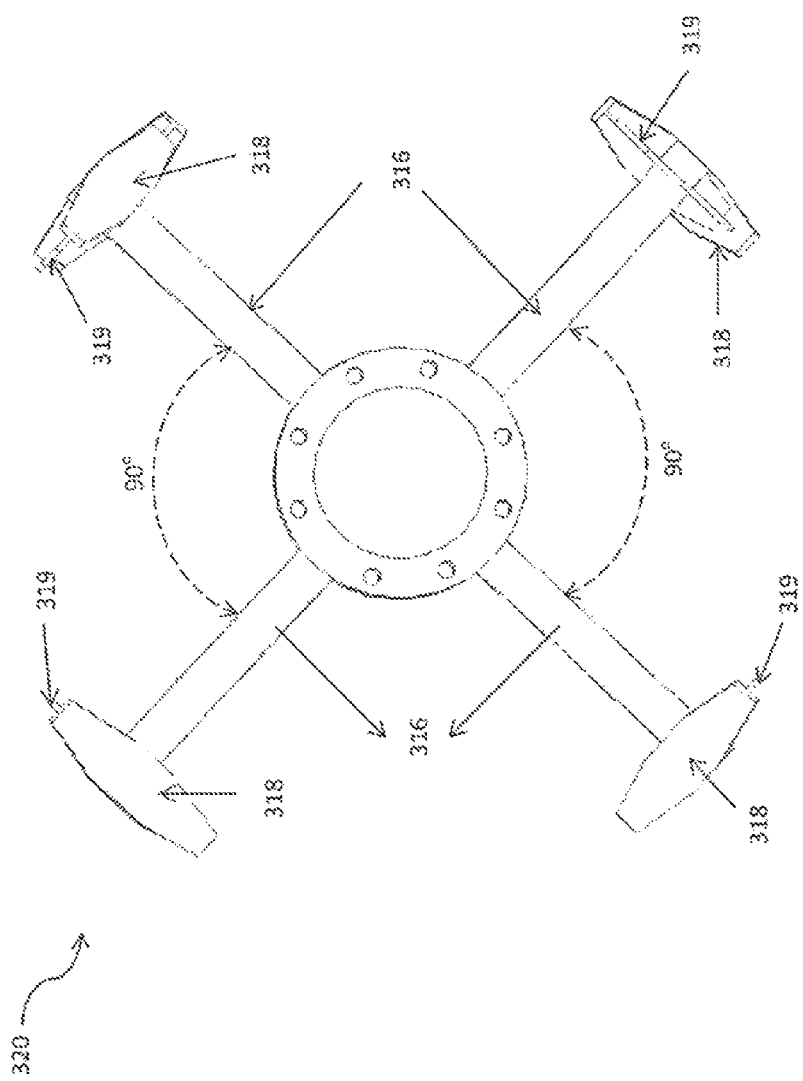

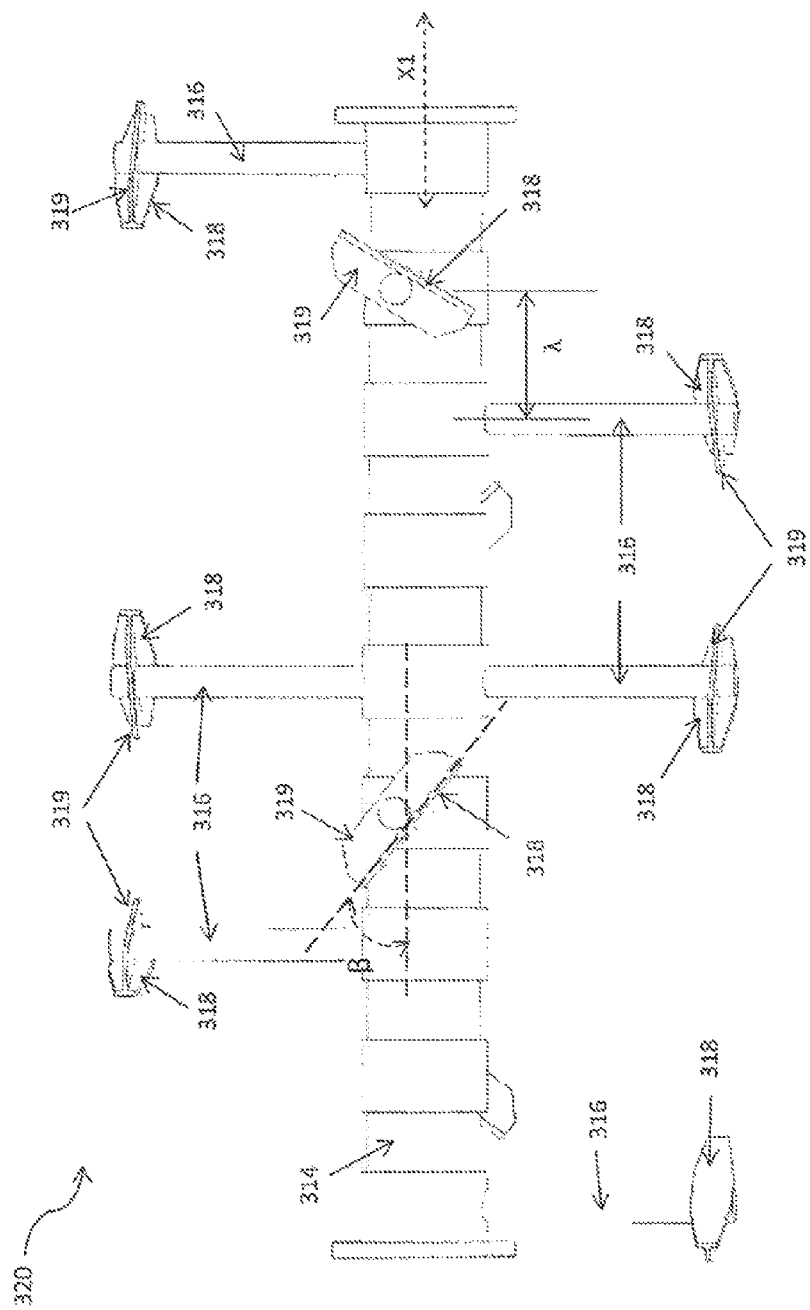

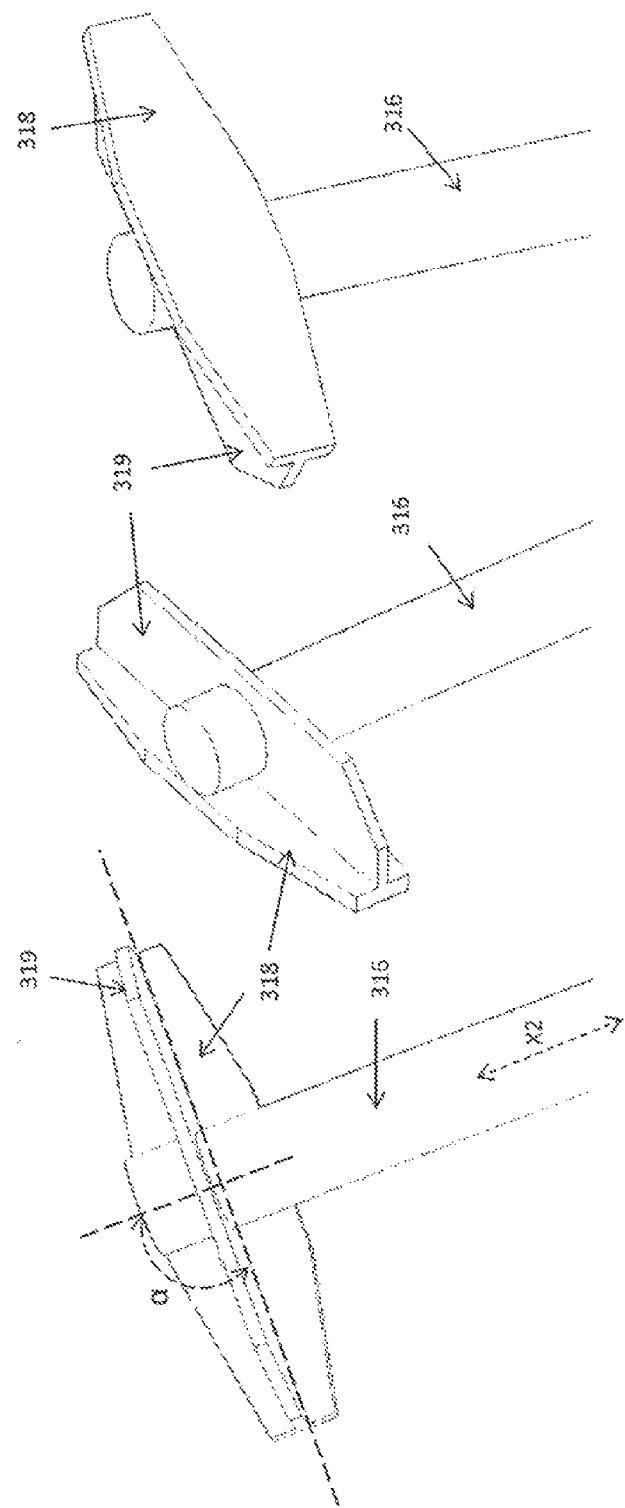

APPARATUS AND SYSTEM FOR TREATING ORGANIC MASS

FIELD OF THE INVENTION

The present invention relates to an apparatus for treating organic mass. More particularly, this invention rebates to a system for recycling ammonia generated from the treatment of organic mass.

BACKGROUND OF THE INVENTION

Large amounts of organic waste are generated annually from agricultural plantations, animal farms, mills, food processing plants and industrial plants. The amount of organic waste generated has been increasing each year as the agro-food industries expand. Consequently, the disposal of these wastes has been a major concern in recent years.

Composting has been recognized as an effective way to address the problem of organic waste disposal. Composting converts organic waste into fertilizers by a microbiological process. However, the natural composting of organic waste by naturally occurring micro-organisms can take up to months and even years to mature, and typically results in a product with relatively low nitrogen, phosphorous and potassium (NPK) values because large amounts of ammonia, ammonium ions, phosphorous, potassium and essential trace elements are lost to the environment during composting period. Such losses decrease the amount of essential elements in the final composted product. Organic fertilizers with low NPK values are less useful and less commercially valuable.

To increase the speed of composting, the organic wastes are aerated either by agitating the waste or by supplying air to the waste. There are many household composting systems known in the art that comprise of agitated or rotating drums supplied with either natural aeration or air blowers. There are also other household systems that include worms or microbes to increase the speed of composting. Aeration aids in the aerobic digestion of organic waste, thereby preventing the production of foul odors when anaerobic conditions set in. While the composting period is reduced to a few weeks, these systems however cannot ensure homogeneous aeration and pockets of anaerobic micro-environments tend to exist.

On the commercial front, there are many known commercial composting systems including windrow composters and tunnel composters. Although windrow and static pile composting systems can handle large amounts of organic waste, they require an equally large amount of land and their use is thus limited to the outskirts of urban areas.

Tunnel composting systems and in-vessel systems, on the other hand, are unable to achieve large-scale operation. Even though these systems may enable at most mid-scale decomposition in an enclosed space, they require high energy consumption which makes them relatively more expensive. Further, the organic fertilizers produced are of inconsistent quality. Known vessel composting systems may provide good mixing capabilities at small volumes of up to 3 tonnes. However, scale-up is problematic because of the increased presence of pockets of anaerobic micro-environments in vessels larger than 3 tonnes. These dead spaces not only result in the production of foul odors, but also compromise the quality of the organic fertilizers produced.

There is yet another known composter which comprises a plurality of paddles to aid in the mixing of compost material. However, such composters consume large amounts of energy and are not economical.

There is therefore a need to provide an apparatus and system for treating organic waste that overcomes, or at least ameliorates, one or more of the disadvantages described above.

SUMMARY OF THE INVENTION

The above the other problems are solved and an advance in the art is made by an improved apparatus for composting organic mass, such as organic waste. A system for recycling ammonia generated from the treatment of organic mass by the apparatus is also disclosed.

The advantages of the apparatus and system include, but not limited to, the following. The apparatus provides a means to scale up composting operations. However, it does not require large amounts of space for the increased amount of throughput. The apparatus enables homogenous aeration throughout the organic waste, thereby reducing foul odors. The organic waste can be treated to well-matured in a relatively short period of time, e.g. less than one day. The apparatus and system produce organic fertilizers with increased NPK values, e.g. NPK value of more than 6. The apparatus and system prevent leeching of nutrients from organic mass. The apparatus and system provide a solution to the waste disposal problem by converting organic waste into useful organic fertilizers.

According to a first aspect of the invention, there is provided an apparatus for treating organic mass. The apparatus comprises a chamber for containing a mixture of organic mass and one or more micro-organisms selected to degrade the organic mass; and agitation means provided in the chamber to agitate the mixture. The agitation means comprises a rotatable shaft extending through a central bore of the chamber; a plurality of agitator arms extending from the shaft; and a paddle connected to each of the plurality of agitator arms. The paddle is arranged to make a first angle with respect to the longitudinal axis of the connected agitator arm and a second angle with respect to the longitudinal axis of the shaft. The plurality of agitator arms with each arm connected with the paddle angled at the first and second angles enable homogenous mixing of the mixture without spilling out of the chamber in response to rotation of the shaft.

The agitation means enable homogenous mixing of the organic mass, thereby increases the surface area of the organic mass exposed to oxygen. Thus, the rate of aerobic degradation of the organic mass may be increased, and the rate of anaerobic degradation of the organic mass may advantageously be reduced. The reduction of the rate of anaerobic degradation advantageously reduces the generation of foul odors during treatment of the organic mass.

The quality of the treated organic mass is dependent on the amount of essential elements of nitrogen (N), phosphorous (P) and potassium (K) (or NPK for short) present in the final product. Generally, the higher NPK value, the better quality of the treated organic mass, i.e. more nutrients in the treated organic mass. For example, treated organic mass with NPK values of 6 and above may be obtained within one day by this invention.

Preferably, the second angle of the paddle is within a range of about 0° to about 180°. Preferably, the second angle of the paddle of each of the plurality of agitator arms is arranged at a different angle for directing the mixture in different directions. Preferably, the second angle of the paddle of each of the plurality of agitator arms runs sequentially from 0° to 180°. Preferably, the second angle of the paddle of each of the plurality of agitator arms runs sequentially from 0°, 45°, 90°, 135° to 180°.

Preferably, the first angle is within a range of about 70° to about 110°. Preferably, the first angle of the paddle of each of the plurality of agitator arms is arranged at a different angle.

Preferably, the agitation means further comprises a member connected to the paddle to form a means for directing the mixture. Preferably, the member is disposed substantially perpendicularly to the paddle in a plane forming a substantially T-shaped configuration. Preferably, the member is disposed at an edge of the paddle in a plane forming a substantially L-shaped configuration.

Preferably, the plurality of agitator arms are evenly spaced along the length of the shaft. Preferably, the central bore of the chamber is substantially parallel to the ground.

Preferably, the chamber is made of a material capable of withstanding the mixture. Preferably, the chamber has a capacity within a range of 4,000 L to 80,000 L. Preferably, the inner wall of the chamber comprises stud-like structures.

Preferably, the paddle is integrally formed with each of the plurality of agitator arms. Preferably, each of the plurality of agitator arms is integrally formed with the shaft.

Preferably, the agitation means further comprises a plurality of paddles connected to each of the plurality of agitator arms.

In accordance with embodiments of this invention, the apparatus further comprises means for controlling environment within the chamber. The environment controlling means includes temperature control means, pH control means, moisture control means and/or aeration means. Preferably, the temperature control means includes heating oil encapsulating at least a portion of the perimeter of the chamber.

Preferably, the one or more micro-organisms are selected from a group consisting of *Bacillus* sp. micro-organisms, *Pseudomarsas* sp. micro-organisms, *Bifidobacterium* sp. micro-organisms, *Lactobacillus* sp. micro-organisms, *Streptomyces* sp. micro-organisms, *Corynebacterium* sp. micro-organisms and mixtures thereof.

Preferably, the apparatus further comprises a system for recycling ammonia generated from the treatment of the organic mass. The system includes means for collecting ammonia generated from the treatment of the organic mass; and means for distributing ammonia collected by the collecting means wherein the distributing means is fluidly connected to the collecting means.

Preferably, the collected ammonia is recycled back to the chamber. Preferably, the collected ammonia is recycled to the treated organic mass outside of the apparatus. Preferably, the collecting means is a pipe capable of withstanding ammonia. Preferably, the distributing means is a pipe capable of withstanding ammonia.

The recycled ammonia increases the amount of essential nitrogen present in the final product. The treated organic mass possesses a high NPK value, and therefore possesses a high amount of nutrients. The treated organic mass can thus advantageously be used as high quality organic fertilizer.

Definitions

The following words and terms used herein shall have the meaning indicated:

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional unrecited elements.

As used herein, the term "about", in the context of concentrations of components of the formulations, typically means +/−5% of the stated value more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, torn 1 to 4, from 1 to 5, from 2 to 4, from 2 to 8, from 3 to 6 etc., as well as individual numbers within that range, for example, 1, 2, 3, 4, 5, and 8. This applies regardless of the breadth of the range.

BRIEF DESCRIPTION OF DRAWINGS

The accompanying drawings illustrate disclosed embodiments and serve to explain the principles of the disclosed embodiments, it is to be understood, however, that the drawings are designed for purposes of illustration only, and not as a definition of the limits of the invention.

FIG. 2a shows a perspective view of another embodiment of an apparatus for treating organic mass in accordance with the present invention.

FIG. 2b shows a perspective internal view of the apparatus illustrated in FIG. 2a.

FIG. 3a shows a perspective view of the opposite side of the apparatus illustrated in FIG. 2a.

FIG. 3b shows a perspective internal view of the apparatus illustrated in FIG. 3a.

FIG. 4b shows a side end view of the agitation means illustrated in FIG. 4a.

FIG. 4c shows a top view of the agitation means illustrated in FIG. 4a.

FIG. 4d shows close-up views of the agitator arm illustrated in FIG. 4a with a paddle and a member connected to it.

DETAILED DESCRIPTION OF THE INVENTION

Organic mass that may be treated by the apparatus of the present invention include, but are not limited to, agricultural waste, food waste, organic refuse, mill effluent, municipal waste, sewage, sludge, animal waste, and industrial waste. Exemplary agricultural wastes include, but are not limited to, oil palm empty fruit bunch (EPB), olive husk, corn cob, coffee bean husk, rice husk, rice straw, spent mushroom compost, palm foliage, palm trunk, palm kernel shells, palm fiber, farm effluent, slaughterhouse waste, biogas sludge, wastewater sludge, leather waste, flower cuttings, spent slower compost, wheat straw, fruit waste, vegetable waste, and the like. Exemplary animal wastes include, hut are not limited to, dead animals, animal feathers, and animal manure such as poultry manure, cow manure, goat manure, horse manure, sheep manure and swine manure. Poultry manure may be chicken dung. Animal wastes may also include human sewage. Mill effluent may be, for example, palm oil mill effluent (POME) and POME sludge.

The organic mass to be treated may be selected based on criteria such as availability due to, for example, geographical or seasonal variability, cost, suitability, desired product and product properties, and the like. For example, in palm oil producing regions, about 8 million tons of empty fruit bunch (EFB) are generated annually, and hence provide an abundant source of organic waste that can be treated to at least parity convert the EFB into useful organic fertilizer. Similarly, a typical food processing plant con generate between about 1.5 to about 2 tons of sludge per day while a poultry slaughterhouse can generate about 300 m$^3$/day of wastewater, which result in abundant sources of organic waste for use in the disclosed system.

As may be appreciated, the organic mass may be wet and/or dense. Accordingly, bulking materials may be added to the mixture in the treatment zone of the apparatus to reduce the density of the mixture and to allow air to penetrate the mixture. As bulking materials are typically dry and porous, they advantageously prevent anaerobic fermentation from occurring in the treatment zone. Examples of bulking materials include, hut are not limited to, saw dust, rice husks, EFB, coffee grounds, threshed wheat and rice straw, spent mushroom compost and dried leaves.

Figure 1:
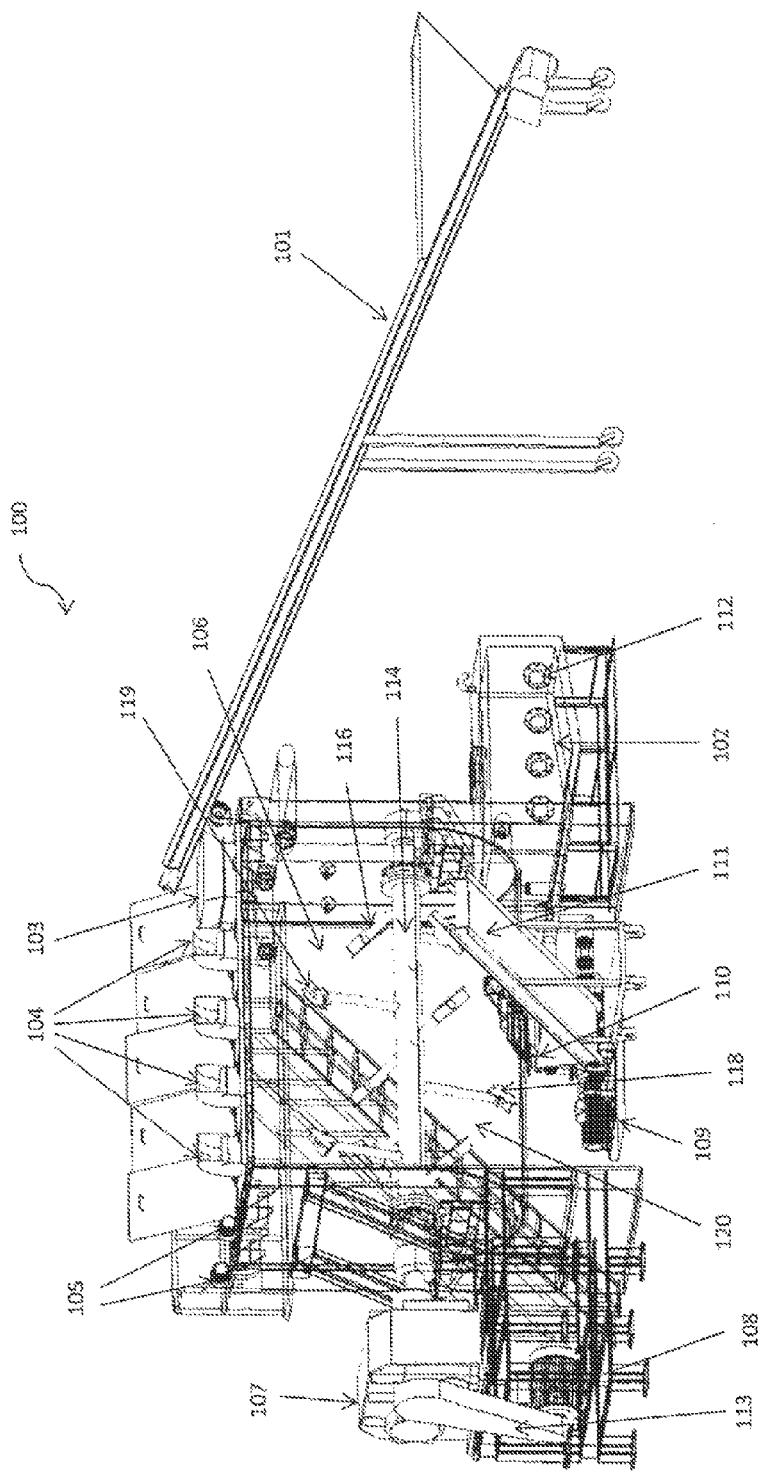
FIG. 1 shows a perspective internal view of an embodiment of an apparatus for treating organic mass in accordance with the present invention.
Figure 3B:
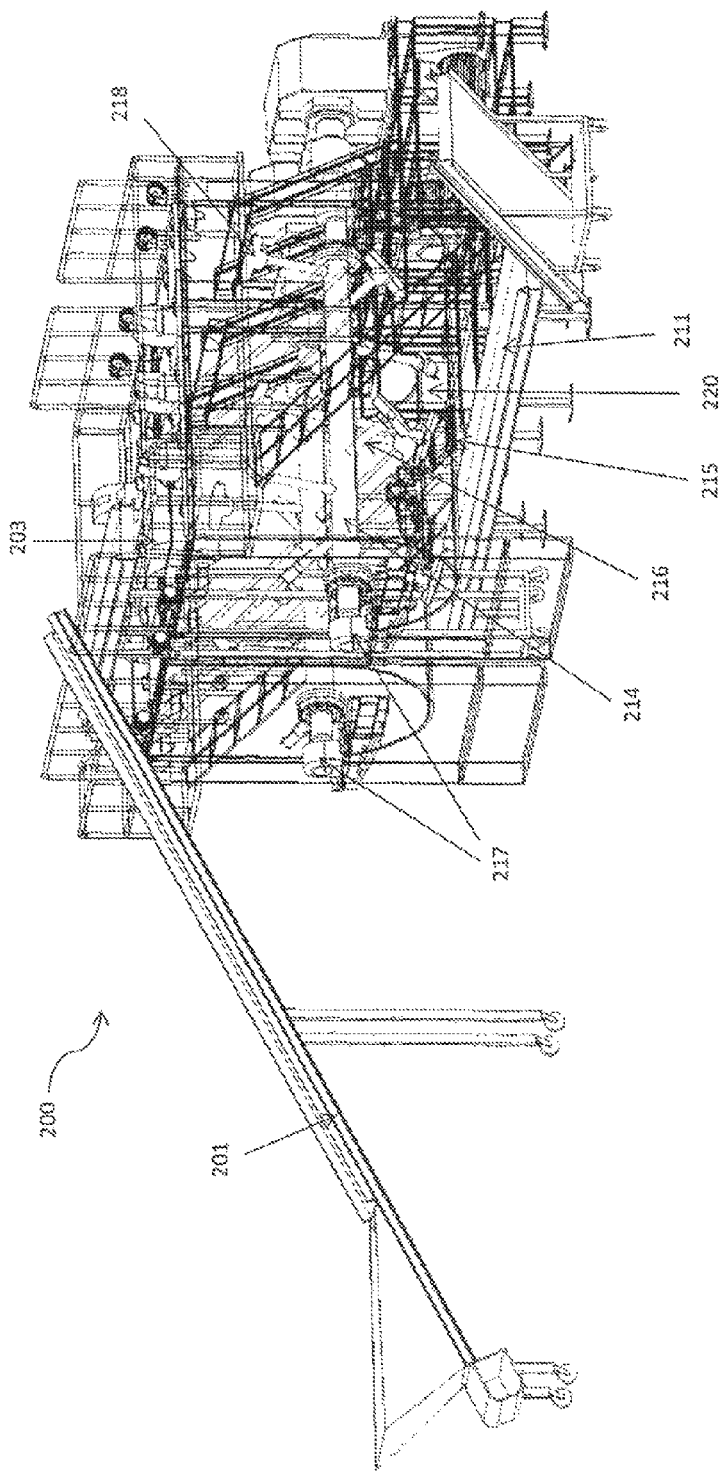

FIG. 1 shows a perspective internal view of apparatus 100 for treating organic mass in accordance with an embodiment of the present invention. Apparatus 100 comprises chamber 106 for containing a mixture of organic mass and one or more micro-organisms selected to degrade the organic mass. Chamber 108 is also called the treatment zone as this is the place where organic mass will be treated. Preferably, chamber 108 is a U-shaped cylindrical container. The mixture is agitated by agitation means 120 provided in chamber 108. Agitation means 120 comprises rotatable shaft 114, a plurality of agitator arms 116, and paddle 118 connected to each agitator and 118. Shaft 114 is extending through a central bore of chamber 108 and rotatable about its longitudinal axis x1 driven by motor 108. Preferably, the central bore of chamber 108 is substantially parallel to the ground. The rotation speed of shaft 114 can be adjusted via gearbox 107. Motor 108 and gearbox 107 are linked by V-belt 113. Paddle 118 may include a member 119 to form a means for directing the mixture within chamber 106.

Organic mass to be treated is introduced into chamber 106 by conveyor belt 101. Conveyor belt 101 transports the organic mass to inlet 103 and into chamber 106. The micro-organisms used to degrade the organic mass are also introduced into chamber 108 via inlet 103. Apparatus 100 may have one or more air blower 105 that provides oxygen to the mixture to accelerate the aerobic degradation of the organic mass. Any excess or by-product gases generated during the treatment of the organic mass may be expelled from chamber 106 via air vent 104. The mixture in chamber 106 is heated by heating oil which encapsulates the entire or at least a portion of the perimeter of chamber 106 by oil circulation pump 103. The temperature of the heating oil is maintained in thermal oil tank 102 by heating element 112. The treated organic mass is discharged from chamber 106 via outlet 110 which may be operated by pneumatic valve. The discharged fertilizer (treated organic mass) is transported away from apparatus 100 by conveyor belt 111.

As shown in FIG. 1 (or FIGS. 4a and 4c), agitator arms 116 are extending from the longitudinal axis x1 of shaft 114. Agitator arms 118 may extend at any suitable angles with respect to the longitudinal axis x1 of shaft 114. Preferably, agitator arms 116 are substantially perpendicular to the longitudinal axis x1 of shaft 114. In some embodiments, agitator arm 118 may extend from shaft 114 at an angle from about 70° to about 110°, or from about 70° to about 100°, or from about 70° to about 90°, or from about 80° to about 110°, or from about 90° to about 110°, with respect to the longitudinal axis x1 of shaft 114. There may be two or more agitator arms 116 that extend from shaft 114. In an embodiment shown in FIG. 4a, ten agitator arms 116 are extending from shaft 114.

Paddle 118 is connected to each agitator arm 116 for agitating and moving the mixture in chamber 106. Paddle 118 may be of any suitable shapes and sizes, e.g. it can be a substantially rectangular planar blade. In some embodiments, each agitator arm 116 may have more than one paddle 118 connected to it. For example, each agitator arm 118 may have two paddles 118. Paddle 118 may be connected to each agitator and 118 at any part of paddle 118 which is suitable for agitating or moving the mixture. For example, paddle 118 is connected to agitator arm 116 at about the middle part of paddle 118 (see FIG. 4d). Further, paddle 118 may be connected to any part along the longitudinal axis x2 of agitator arm 116. Preferably, paddle 118 is connected adjacent to an end portion of agitator arm 116 opposed to the end connected to shaft 114. Paddle 118 that connected to the end portion of agitator arm 116 and proximal to the inner wall of chamber 106 promotes homogenous mixing. The gap between paddle 118 and the inner wall of chamber 106 may be 15 mm.

Paddle 118 (or 318 as shown in FIGS. 4c and 4d) is arranged to make a first angle α with respect to the longitudinal axis x2 of agitator arm 118 (or 316) and a second angle β with respect to the longitudinal axis x1 of shaft 114 (or 314). The first angle α of paddle 118 is within a range of about 70° to about 110°. Preferably, the first angle α is about 90°, i.e. paddle 118 is substantially perpendicular to the longitudinal axis x2 of agitator arm 116. In some embodiments, the first angle α may be a value from about 70° to about 110° or from about 70° to about 100°, or from about 70° to about 90°, or from about 80° to about 110°, or from about 90° to about 110°. The first angle α of paddle 118 of each agitator arm 116 may be angled at the same or different angle.

The second angle β of paddle 118 is within a range of about 0° to about 180°. When toe second angle β is 0°, the longitudinal axis of paddle 118 is substantially parallel to the longitudinal axis x1 of shaft 114. Each paddle 118 may be angled at a different second angle β such that the mixture is directed in different directions to enable thorough mixing. In some embodiments, the second angle β of paddle 118 of each agitator arm 116 may be angled at the same angle. In some embodiments, the second angle β sequentially runs from 0° to 180°. In some embodiments, the second angle β sequentially runs from 0°, 45°, 90°, 135° to 180°. As such, the mixture directed along a path of travel by one paddle may be scooped up by the next sequentially angled paddle. Accordingly, the sequentially angled paddles advantageously ensure that the mixture is constantly agitated.

Paddle 118 may have member 119 connected to it to form a means for directing the mixture within chamber 108. Member 119 may be of any suitable shapes and sizes, such as a substantially rectangular planar structure. Member 119 may be integral to paddle 118 to form a single piece, or coupled/attached to paddle 118. In use, paddle 118 and member 119 rotate in motion together with rotatable shaft 114 to direct a portion of the mixture along a direction of travel. Member 119 is disposed on paddle 118 in a plane and angled from the plane of paddle 118 such that the mixture is caught by paddle 118 and member 119 and directed along a direction of travel. Hence, member 119 provides an enhanced scooping effect of paddle 118. Member 119 may be disposed on paddle 118 in a plane, at an angle from about 70° to about 110°, or from about 70° to about 100°, or from about 70° to about 90°, or from about 80° to about 110°, or from about 90° to about 110°, with respect to paddle 118. Preferably, member 119 is substantially perpendicular to paddle 118 in a plane such that paddle 118 and member 119 form a substantially T-shaped structure configuration (see FIG. 4d). In some embodiments, member 119 is disposed on an edge of paddle 118 in a plane, forming a substantially L-shaped structure.

Preferably, paddle 116 disposed proximal to the inner surface (wall) of chamber 106 to aid in moving unmixed pockets of the mixture proximal to the sides of chamber 106. Paddle 118 prevents the mixture from being pushed to the sides or the top of chamber 106. Thus, paddle 118 may advantageously prevent, the mixture from spilling out of chamber 106 during mixing. Paddle 118 may be integrally formed with agitator arm 116, and agitator arm 118 may be integrally formed with rotatable shaft 114. In some embodiments, rotatable shaft 114, agitator arm 118 and paddle 118 may be coupled to each other. For example, agitator arm 110 may be welded onto rotatable shaft 114, and paddle 118 is welded onto agitator arm 116.

The organic mass in chamber 108, such as animal waste and sludge, may be viscous and/or dense. Thus, it may be difficult to attain sufficient mixing of such dense organic mass so as to maximize the surface area of the organic mass exposed to the micro-organisms and the conditions optimal for the treatment of the organic mass in chamber 106. Hence, agitation means 120 is made from a material capable of withstanding mixing or agitation of dense material. For example, agitation means 120 may be made of stainless steel, such as SUS 304 grade stainless steel.

Agitator arms 116 may be regularly/evenly spaced or arranged at predetermined intervals λ along the length of rotatable shaft 114. This configuration advantageously allows the mixing of the mixture in chamber 116 to be maximized. The distance between each agitator arm 116 disposed along the length of rotatable shaft 114 depends on the capacity of chamber 106 of apparatus 100. Typically, the distance λ between each agitator arm 116 may be from about 200 mm to about 450 mm. For an example of chamber 106 having a capacity of 4,000 liters, the distance between each agitator arm is about 252.5 mm. For another example of chamber 186 having a capacity of 22,000 liters or 80,000 liters, the distance between each agitator arm 116 is about 415 mm. In other embodiments, the distance λ is about 277 mm for a chamber of 22,000 liters, and about 367 mm for a chamber of 22,000 liters. The longitudinal length of shaft 114 may range from about 3.8 m (e.g. for a chamber of 22,000 L) to about 5 m (e.g. for a chamber of 80,000 L). The diameter of shaft 114 may range from about 26 cm (e.g. for a chamber of 22,000 L) to about 35 cm (e.g. for a chamber of 80,000 L).

Agitator arms 116 may be regularly spaced around the circumference of rotatable shaft 114 to maximize the mixing of the mixture in chamber 106. In some embodiments, when viewing the cross-section of rotatable shaft 114 perpendicular to the central bore, two agitator arms 116 may offset from each other at an angle of about 70° to about 110°. For an embodiment shown in FIG. 4b, agitator arms 316 are offset from each other at about 90°.

Agitator arm 116 may be of any suitable shapes and sizes that sufficient to move or agitate the mixture in chamber 106. For example, as illustrated in the figures, agitator arm 116 has a rod-like shape. In other embodiments, agitator arm 116 is of a fin-like shape. In some embodiments, the edges of agitator arm 118 are sharp or tapered and able to cut through the organic mass to maximize the mixing of the mixture. Advantageously, the mixing increases the surface area of the organic mass that is exposed to the micro-organisms, and thus increases the contact of the organic mass with the micro-organisms.

Rotatable shaft 114 may be rotated by any means known in the art, such as a motor. The motor should have sufficient power to rotate shaft 114 to sufficiently agitate or mix the mixture in chamber 106. The organic mass may be viscous and/or dense and thus may be difficult to mix. Hence, the rotation speed of shaft 114 should be configured to ensure sufficient agitation of the mixture. The rotation speed is adjustable depending on the type of organic mass used.

Advantageously, agitation means 120 (which comprises rotatable shaft 114, agitator arms 116 and paddles 118) is more cost effective than having a plurality of independent agitators or paddles disposed in the treatment zone. Advantageously, the cost of constructing apparatus 100 is lower than the cost of constructing an apparatus having a plurality of independent agitators or paddles. Furthermore, the operational cost of apparatus 100 may be lower than that of an apparatus with a plurality independent agitators or paddles because of lower energy consumption and lower maintenance cost due to fewer moving parts in apparatus 100.

FIGS. 1 and 2a show that chamber 106 is an enclosed cylindrical chamber. However, chamber 106 may be in any other suitable shapes. Advantageously, a cylindrical chamber may reduce the possibility of dead spaces, i.e., unmixed pockets, which may be present in the chamber with angular corners. Chamber 106 may be of any capacity ranging from about 4,000 liters (L) to about 80,000 liters (L). For example, chamber 106 may have a capacity of 4,000 L, 22,000 L, 60,000 L or 80,000 L. The treatment of organic mass may be performed on an industrial scale using apparatus 100, and does not require an excessive amount of space. Further, any foul odors or gaseous emissions can be prevented from being released to the surroundings. Thus, any foul odors or gaseous emissions that can cause respiratory or allergic problems to humans can be reduced or prevented. The use of apparatus 100 is not restricted to its location. For example, apparatus 100 may be situated near the waste generation site for increased convenience and accessibility to the organic biomass. Alternatively, apparatus 100 may be situated in built-up areas. The capacity of apparatus 100 may be scaled down to as low as 10 liters, and scaled up to as high as 400,000 liters.

Chamber 106 may be fabricated from any suitable material which is capable of withstanding acidic or alkaline mixtures, such as the pH of empty fruit bunch (EFB) is about pH 6, the pH of citrus peel is about pH 4, and the pH of chicken manure is about pH 9. For example, chamber 106 may be made of stainless steel, such as SUS 304 grade stainless steel. Alternatively, chamber 106 may be made of a polymer material which includes, but are not limited to, an epoxy, vinyl esters, polyester thermosetting plastics or phenol formaldehyde resins. The polymer material may be a composite reinforced with fibres. Examples of fibres that may be used include, but are not limited to, glass, carbon, aramid, paper, wood or asbestos. In some embodiments, chamber 106 is made of fibre-reinforced plastic.

The inner wall of chamber 100 may comprise stud-like structures extending into the treatment zone. The stud-like structures may be spikes. The stud-like structures are able to break up the organic-mass agitated by agitation means 120 in chamber 106 and thus increase the surface area of the organic mass that is exposed to the micro-organisms. Hence, maximum contact of the organic mass with the micro-organisms is ensured.

Apparatus 100 may further comprise means for controlling the environment within chamber 106. The environment controlling means may include temperature control means, pH control means, moisture control means and/or aeration means. Apparatus 100 may also comprise a control unit for controlling the environment within chamber 106. The temperature control means is in thermal communication with chamber 106 to control the temperature of the mixture. The temperature control means may be configured to control the temperature of the mixture of organic mass and micro-organisms located in chamber 106. Typically, the temperature control means is capable of controlling the temperature of the mixture to a range of temperatures, such as from about 20° C. to about 150° C. Advantageously, the temperature control means provides precise temperature control of chamber 108. The precise temperature control of chamber 106 ensures that the metabolic activity of the micro-organisms operates at an optimal level to treat the organic mass. In some embodiments, the treated organic mass, i.e. organic fertilizer, with high NPK values (e.g. 6 and above) can advantageously be achieved in less than 48 hours, or less than 36 hours, or less than 24 hours, or less than 12 hours.

The temperature control means may comprise heating means and cooling means. The heating means may be any suitable means known in the art. The heating means may comprise one or more electrical heating elements, or one or more heat exchangers, through which, for example, heating oil is circulated. The heating means may also comprise of electric or gas heaters, or jets of hot air which can be directed specifically at chamber 106. The heating means may be a steam generator. The heating means may also be a waste heat source, a solar heat source or a geothermal heat source. Exemplary waste heat sources include flue gases from gas turbines in power plants and incinerators, process gases of chemical and metallurgical operations and waste heat from other industrial processes. The heating means may further be insulated using any suitable insulation techniques known in the art to minimize heat loss. Typically, the heating means is capable of heating the organic mass to about 80° C. to about 150° C.

The cooling means may be any suitable means known in the art. The cooling means may be a stream of cold nitrogen gas. The cooling means may also comprise of one or more heat exchangers. Typically, the cooling means is capable of reducing the temperature of the organic mass to about 35° C. to about 75° C.

The pH control means may adjust, the pH of the mixture. The pH may be controlled at values of about 3 to about 10. If the pH is higher or lower than the desired value, an appropriate pH buffer such as a phosphate buffer, an acetate buffer, a Tris buffer, and the like, may be added.

The moisture control means maintains the moisture level of the mixture of organic mass and micro-organisms at a suitable level. The degradation of organic mass by the micro-organisms is enhanced by the presence of moisture in the mixture at levels of about 10 wt % to about 22 wt %. The moisture levels of the mixture may be adjusted by means that are well known to those skilled in the art. For example, if the moisture content of the mixture is too high, hot air may be blown over the mixture via air blowers. Alternatively, the organic mass may be blended with other organic mass that has lower moisture content such as rise husk, rice straw, saw dust, and the like, to achieve the desired moisture content level. Conversely, if the moisture content of the mixture is too low, water may be sprayed onto the mixture via spray bars.

The anaerobic degradation of organic mass generates foul odor. Further, the metabolic activity of the micro-organisms decreases when the carbon dioxide concentration increases. Hence, apparatus 100 may comprise aeration means for aerating chamber 100 during treatment of the organic mass. Aerating the organic mass in chamber 108 increases the rate of aerobic degradation and decreases the rate of anaerobic degradation of the organic mass. Advantageously, predominantly aerobic conditions accelerate the degradation rate of organic mass by the action of micro-organisms. Further advantageously, the emission of the foul-smelling by-products from the anaerobic degradation process, such as methane, is reduced. As methane emissions are typically regulated by national environmental agencies, the reduction of methane emission aids in meeting emission regulation standards.

The aeration means may be an air blower. The air blower may deliver air at a pressure sufficient to ensure that the air reaches the organic mass quickly and easily. As may be appreciated, the air pressure required is dependent on the capacity of apparatus 100. To achieve the required air pressure, the number of air blowers used may range from two to eight. Further, the air may be provided continuously during the treatment, or may be provided periodically according to a pre-determined regime. In a particular embodiment, apparatus 100 may comprise four air blowers 105 with each providing an air pressure of 37 millimeter water (mmAq). For example, air blowers 105 may be arranged to operate for duration of 10 minutes with a gap of 20 minutes between each operation. Apparatus 100 may also comprise one or more air vent 104 for expelling excess gas from apparatus 100.

Apparatus 100 has inlet 103 for receiving organic mass to be treated. The organic mass may be manually introduced into chamber 106 or automatically introduced into chamber 106 by conveyor belt 101. Apparatus has outlet 110 through which the treated organic mass, i.e. organic fertilizer, is offloaded. The treated organic mass may be manually offloaded from apparatus 100 or automatically offloaded and transferred out from apparatus 100 by conveyor belt 111.

The micro-organisms useful for the treatment and/or degradation of the organic mass are those that are capable of degrading carbon compounds or fixing nitrogen compounds. Advantageously, mixed cultures of the micro-organisms are used in order to obtain a broad spectrum of degradation or fixation. The selection of the micro-organisms is dependent on the type of organic mass that is to be treated. The micro-organisms selected to degrade the organic mass may be selected from the group consisting of *Bacillus* sp. micro-organisms, *Pseudomonas* sp. micro-organisms. *Bifidobacterium* sp. micro-organisms, *Lactobacillus* sp, micro-organisms, *Streptomyces* sp. micro-organisms and *Corynebacterium* sp. micro-organisms. In some embodiments, the one or more micro-organisms are selected from the group consisting of *Bacillus* sp. micro-organisms, *Pseudomonas* sp. micro-organisms, *Bifidobacterium* sp. micro-organisms, *Lactobacillus* sp. micro-organisms, *Streptomyces* sp. micro-organisms, *Corynebacterium* sp. micro-organisms and mixtures thereof.

The treated organic mass, or organic fertilizer, may have an NPK value of more than 6. The NPK value determines the amount of nitrogen (N), phosphorous (P) and potassium (K) present in the organic fertilizer. These nutrients are typically lost to the environment when conventional composting methods and systems are used. Thus, high NPK values indicate an organic fertilizer that possesses a high amount of nutrients and is therefore a fertilizer of high quality. Advantageously, apparatus 100 may produce the matured organic fertilizer with high NPK values (6 and shove) within one day.

Apparatus 100 may be disposed on an elevated support, such as legs or stands. The support may be designed to carry the weight, of the entire apparatus. Accordingly, the size of the support is dependent on the size of the apparatus. Apparatus 100 may comprise a ladder and an operation platform for easy access to, for example, inlet 103. Apparatus 100 may further comprise safety features such as an emergency step device. The emergency stop device may halt the power to apparatus 100 in the event of an emergency, for example, a run-away reaction or when the agitation means is jammed. Other safety features may include safety railings along the ladder and the operation platform.

Apparatus 100 may further comprise a system for recycling ammonia generated from the treated organic mass. The system comprises means for collecting ammonia generated from the treatment of the organic mass and means for distributing the collected ammonia. The distributing means is fluidly connected to the collecting means for distributing the collected ammonia. Hence, the system prevents the loss of nitrogen in the form of ammonia. As ammonia emissions are typically regulated by national environmental agencies, the reduction of ammonia emissions advantageously aids in meeting emission regulation standards.

The collected ammonia may be recycled back to chamber 106 to boost the NPK value of the treated organic mass. Alternatively, the collected ammonia may be recycled to the treated organic mass outside of apparatus 100. Advantageously, the recycled ammonia boosts the NPK value of the organic mass. Further advantageously, the emitted ammonia by-product is reused. The collecting means and the distributing means may be of any suitable means. For example, the collecting means and the distribution means are pipes. The pipes should be made from a material capable of withstanding ammonia. For example, the pipes are made of stainless steel, such as SUS 304 grade stainless steel. Alternatively, the pipes may be made of a polymer material which includes, but are not limited to, an epoxy, vinyl esters, polyester thermosetting plastics or phenol formaldehyde resins. The polymer material may be a composite reinforced with fibres. Examples of fibres that may be used include, but are not limited to, glass, carbon, aramid, paper, wood or asbestos. In some embodiments, the pipes are made of fibre reinforced plastic. The system may further comprise testing means to monitor the percentage recovery of ammonia. The testing means may be any suitable means known in the art. For example, the system may comprise a bio-filter. The bio-filter may be one that is known in the art. The system recovers more than 80% of the ammonia emitted from the degradation of the organic mass.

Apparatus 100 may be modular in which it comprises two or more chambers 106. The two or more chambers 106 may be arranged parallel to each other or in any other arrangements. The use of two or more chambers may increase the throughput of the organic mass to be treated. FIGS. 2*a*, 2*b*, 3*a* and 3*b* show apparatus 200 comprises two chambers 206 arranged parallel to each other to increase the throughput of the organic mass to be treated. The components present in apparatus 200 are similar to the components present in apparatus 100. The organic mass to be treated is introduced into the respective chambers 206 of apparatus 200 by conveyor belt 201. Conveyor belt 201 has two ends above inlets 203 of the respective chambers 206 for delivery the organic mass into chambers 206. Conveyor belt 201 has a T-shaped configuration. Other suitable shapes and means for transferring the organic mass into inlets 203 are possible. Each chamber 206 possesses agitation means 220. Similar to agitation means 120, agitation means 220 comprises rotatable shaft 214, agitator arms 216 and paddles 218. Rotatable shaft 214 is rotated about its longitudinal axis by motor 208 at one end of chamber 206 and is fixed at the other end of chamber 208 by bearing 217 (see FIGS. 3*a* and 3*b*). The mixture of organic mass and micro-organisms in chamber 206 is heated by heating oil encapsulating the entire or at least a portion of the perimeter of chamber 206. The heating oil is heated by a thermal oil tank (not shown). The treated organic mass is offloaded via outlet 215 and transported away by conveyor belt 211.

Figure 4A:
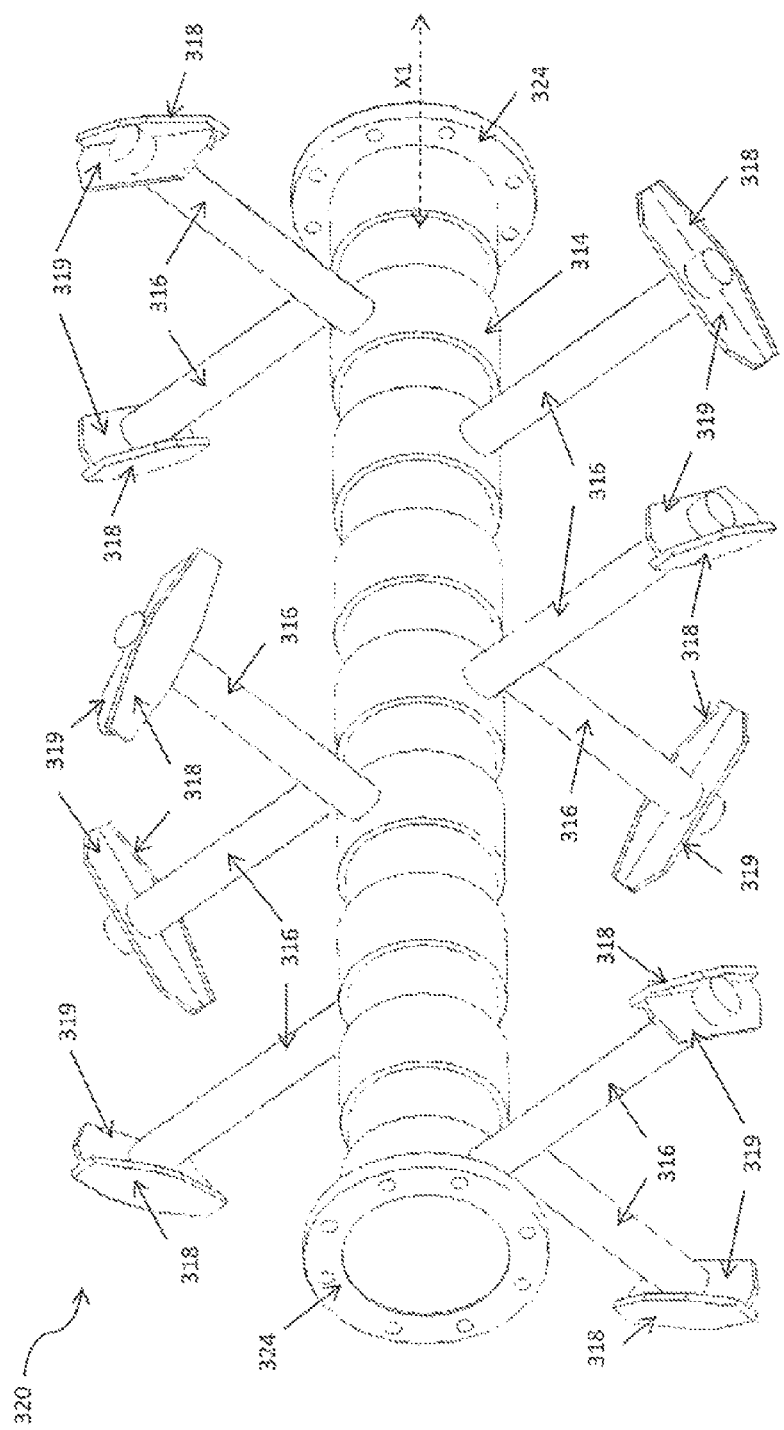
FIG. 4a shows a perspective view of an embodiment of an agitation means in accordance with the present invention.

FIGS. 4*a*, 4*b* and 4*c* show different views of agitation means 320 in accordance with an embodiment of the present invention. FIG. 4*a* shows agitation means 320 comprises ten agitator arms 316 extending from rotatable shaft 314. Agitation means 320 may have any suitable numbers of agitator arms 316, depending on the capacity of the treatment chamber. For examples, a chamber of 22,000 L may have 10 to 14 agitator arms 316, and a chamber of 80,000 L may have 14 to 16 agitator arms 316. Paddle 318 is connected to each agitator arm 316. Each agitator arm 318 is substantially perpendicularly extends from the longitudinal axis of rotatable shaft 314. Flanges 324 connect two ends of rotatable shaft 314 to the external of treatment zone.

The side end view of agitation means 320 is shown in FIG. 4*b*. It can be seen from FIG. 4*b* that agitator arms 316 are offset from each other at about 90°. The top view of agitation means 320 is shown in FIG. 4*c*. The distance λ between two agitator arms 316 along the length of rotatable shaft 314 is depends on the capacity of the apparatus. For example, when the disclosed apparatus has a chamber of 4,000 L capacity, the distance λ is about 252.5 mm. For another example, the distance λ is about 415 mm when the apparatus has a chamber of 22,000 L or 80,000 L capacity.

Close-up diagrams of paddle 318 disposed at an end portion of agitator arm 316 are shown in FIG. 4*d*. Member 310 is connected to paddle 318 to form a T-shaped structure for directing the mixture. Member 319 may also be connected to an edge of paddle 318 to form a L-shaped structure.

Figure 5:
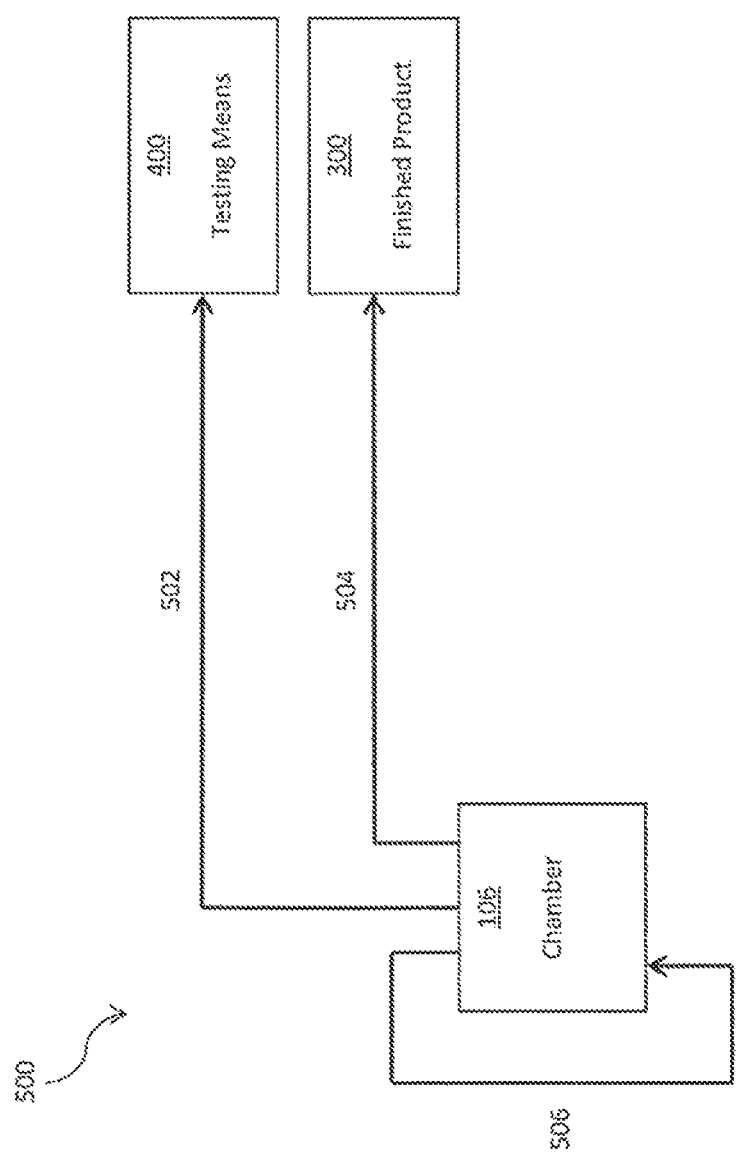
FIG. 5 shows a schematic diagram of an embodiment of a system for recycling ammonia in accordance with the present invention.

A schematic diagram of system 500 for recycling ammonia generated from the treatment of the organic mass by the apparatus as disclosed above is shown in FIG. 5. Pipes 602, 604 and 506 connect chamber 106 (or 206) of apparatus 100 (or 200) to other areas. For example, pipe 502 connects treatment zone 106 to testing means 400, pipe 504 connects chamber 106 to the finished fertilizer product 380, and pipe 506 recycles the generated ammonia back to chamber 106.

Ammonia emitted from the treatment of organic mass exits chamber 106 along pipes 502, 504 and 508. Pipe 502 directs the ammonia to testing means 400 so that the amount of ammonia recovered can be monitored. Pipe 504 directs the ammonia to the finished fertilizer product 300 to boost the NPK value of product 300. Pipe 506 recycles the ammonia back to chamber 106 as a source of nutrients for the treatment of organic mass.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

What is claimed is:

1. An apparatus for treating organic mass within a period of time of less than 24 hours with the treated organic mass has a nitrogen-phosphorous-potassium (NPK) value of at least 6, the apparatus comprising:
   a chamber configured to contain a mixture of organic mass and one or more micro-organisms selected to degrade the organic mass wherein the chamber includes:
      a U-shaped container having a curved bottom, and
      an inlet opening on a top side of the U-shaped container for inserting the organic mass and one or more micro-organisms into the U-shaped container; and
   an agitator provided in the chamber to agitate the mixture, the agitator comprising:
      a rotatable shaft extending through a central bore of the chamber,
      a plurality of agitator arms extending outward from the rotatable shaft, wherein the plurality of agitator arms are arranged in a plurality of longitudinal rows running along the longitudinal axis of the rotatable shaft such that at least two agitator arms are provided along each of said longitudinal rows, and
      a plurality of paddles wherein each of the plurality of paddles is connected to one of the plurality of agitator arms, each of the plurality of paddles being arranged to make a first angle with respect to the longitudinal axis of the connected agitator arm within a range of about 70° to about 110°, and arranged at a second angle with respect to the longitudinal axis of the rotatable shaft,
      wherein each paddle disposed on a different agitator arm along the same longitudinal row of the shaft are arranged at a different second angle, and
      a portion of a plurality of combined paddles and agitator arms are arranged such that the paddles of the portion are proximal an inner wall of the U-shaped contained and prevent spillage of the mixture through the inlet opening.

2. The apparatus according to claim 1, wherein the second angle of each of the plurality of paddles is one of 0°, 45°, 90°, 135°, and 180°.

3. The apparatus according to claim 1, wherein the first angle of each of the plurality of paddles is within a range of about 80° to about 110°.

4. The apparatus according to claim 1, wherein the first angle of each of the plurality of paddles is different.

5. The apparatus according to claim 1, wherein the agitator further comprises a plurality of members wherein each of the plurality of members is connected to a corresponding one of the plurality of paddles to form a means for directing the mixture.

6. The apparatus according to claim 5, wherein each of the plurality of members is disposed substantially perpendicularly to a front surface plane of the corresponding one of the plurality of paddles to form a substantially T-shaped configuration.

7. The apparatus according to claim 5, wherein at least one of the plurality of members is disposed at an edge of the corresponding one of the plurality of paddles in a plane forming a substantially L-shaped configuration.

8. The apparatus according to claim 1, wherein the plurality of agitator arms are evenly spaced along the length of the shaft.

9. The apparatus according to claim 1, wherein the central bore of the chamber is substantially parallel to the ground.

10. The apparatus according to claim 1, wherein the chamber is made of a material capable of withstanding the mixture.

11. The apparatus according to claim 1, wherein the chamber has a capacity within a range of 4,000 L to 80,000 L.

12. The apparatus according to claim 1, wherein the paddle is integrally formed with each agitator arm.

13. The apparatus according to claim 1, wherein each agitator arm is integrally formed with the shaft.

14. The apparatus according to claim 1, wherein the agitator further comprises more than one of the plurality of paddles connected to one of the plurality of agitator arms.

15. The apparatus according to claim 1, further comprising:
   an environment controlling system within the chamber so as to provide an optimal environment condition for treating the organic mass, the environment controlling system comprises:
      a temperature control system for regulating temperature of the mixture,
      a moisture control system for adjusting moisture level of the mixture,
      an aeration system for introducing air to the mixture, and
      a pH control system for adjusting pH level of the mixture.

16. The apparatus according to claim 15, wherein the temperature control system includes heating oil encapsulating at least a portion of the perimeter of the chamber.

17. The apparatus according to claim 1, wherein the one or more micro-organisms are selected from a group consisting of *Bacillus* sp. micro-organisms, *Pseudomonas* sp. micro-organisms, *Bifidobacterium* sp. micro-organisms, *Lactobacillus* sp. micro-organisms, *Streptomyces* sp. micro-organisms, *Corynebacterium* sp. micro-organisms and mixtures thereof.

18. The apparatus according to claim 1, further comprising:
   an ammonia collection system for collecting ammonia generated from the treatment of the organic mass; and
   an ammonia distribution system for distributing the collected ammonia wherein the ammonia distribution system is fluidly connected to the ammonia collection system.

19. The apparatus according to claim 18, wherein the ammonia distribution system recycles the collected ammonia back to the chamber.

20. The apparatus according to claim 18, wherein the ammonia distribution system recycles the collected ammonia to the treated organic mass outside of the apparatus.

21. The apparatus according to claim 18, wherein the ammonia collection system is a pipe capable of withstanding ammonia.

22. The apparatus according to claim 18, wherein the ammonia distribution system is a pipe capable of withstanding ammonia.

23. The apparatus of claim 1 further comprising a conveyor belt that conveys at least one of the organic mass and the micro-organisms from the ground to the inlet opening in the chamber.

* * * * *